No. 646,402. Patented Mar. 27, 1900.
W. G. KENDALL.
CUSHION TIRE.
(Application filed Oct. 7, 1899.)
(No Model.)

Witnesses
Inventor
Webber G. Kendall
By J. R. Nottingham
Attorney

UNITED STATES PATENT OFFICE.

WEBBER G. KENDALL, OF PROVIDENCE, RHODE ISLAND, ASSIGNOR TO THE KENDALL RUBBER TIRE COMPANY, OF PORTLAND, MAINE.

CUSHION-TIRE.

SPECIFICATION forming part of Letters Patent No. 646,402, dated March 27, 1900.

Application filed October 7, 1899. Serial No. 732,954. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to cushion-tires for vehicle-wheels, being especially adapted to the metal-tired wheel already in use; and it consists, essentially, of a solid or partially-solid rubber tire, approximately semicircular in cross-section, having inwardly-projecting securing-flanges and a flat seat, which form a rectangular channel or groove to receive the outer periphery of the wheel.

The invention further consists of lining the inner sides of the flanges and seat forming the channel or groove with one or more thicknesses of canvas firmly cemented, by vulcanizing or otherwise, to the rubber forming the tire.

The invention still further consists of setting back the inwardly-projecting securing-flanges and filling in the angle formed thereby with rubber, which is molded with and forms an integral part of the tire and flange.

The primary object of the invention is to produce a cushion-tire of the simplest and least-expensive form of construction, at the same time providing for strength and durability, so that it will withstand the sudden shocks and jars to which it may be subjected.

Another object of the invention is to so construct the tire that injury from lateral strain will be reduced to a minimum.

Other objects will become apparent upon a more detailed description of the invention.

Figure 1:
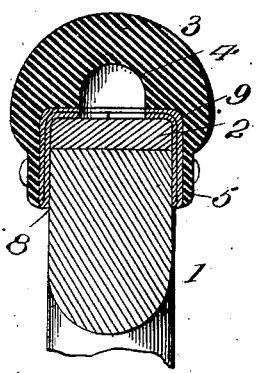
Figure 2:
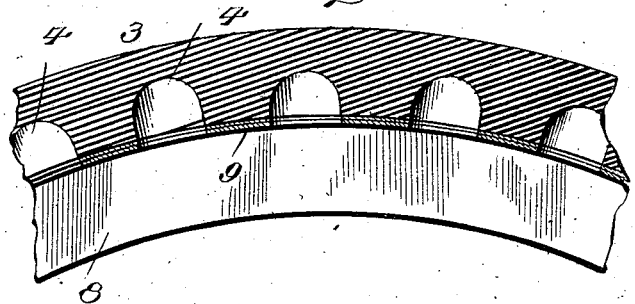
Figure 3:
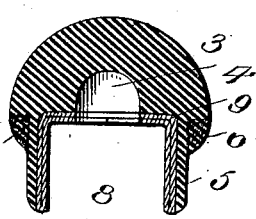

In the accompanying drawings, Figure 1 is a transverse sectional view of the rim of a wheel and my improved tire applied thereto; Fig. 2, a central longitudinal section of a portion of the tire; Fig. 3, a transverse section of the tire, showing in dotted lines the filling in the angle made by forming the securing-flanges in a set-back position; and Figs. 4, 5, and 6, modified forms of my invention.

Referring to the several views of the drawings, the numeral 1 indicates the felly or rim of an ordinary vehicle-wheel, and 2 the metal tire thereof.

The numeral 3 indicates a rubber tire, semicircular in cross-section, preferably provided on its inner periphery with a longitudinal row of holes or cavities 4 and having inwardly-projecting securing-flanges 5. These flanges are set back a short distance from the outer side surface of the tire, as indicated by the dotted lines in Fig. 3, and a filling 6 is molded in the angle formed thereby, thus strengthening the weak point usually inherent in this class of tires. By providing the tire with the cavities 4 two objects are accomplished. The cavities permit of a cushioning effect, and the solid wall or partition between the cavities serves to instantly restore the tire to its normal form or shape as soon as the lateral strain or expansion ceases. This feature of my invention is of great value and importance, as it renders the tire more durable and preserves its shape for a much longer time than is usual in tires of this character.

Figure 4:
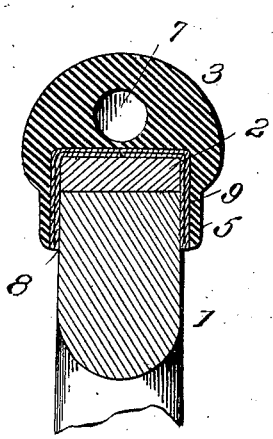
Figure 5:
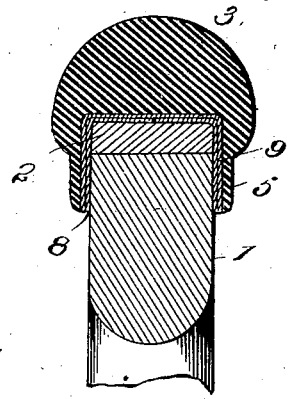

Instead of forming the tire with the cavities 4 I may provide for a cushioning effect by forming it with a longitudinal channel 7, as shown in Fig. 4; but this form is not so desirable, as the constant strain and lateral expansion are apt to cause the sides of the tire to crack.

The securing-flanges and inner periphery of the tire, which is flat, form a right-angled channel or groove 8, designed to fit the metal-tired rim of the wheel. The inner sides of the flanges and the inner periphery of the tire are reinforced by one or more thicknesses of canvas or other non-elastic material 9. This non-elastic material is firmly secured to the rubber by cement and then vulcanized. It gives additional strength to the weak places and renders the flanges sufficiently strong and rigid to permit of the tire being firmly secured thereby to the rim or felly of the wheel. The reinforcing material may be perforated to correspond with the cavities 4 in the tire, if desired.

Figure 6:
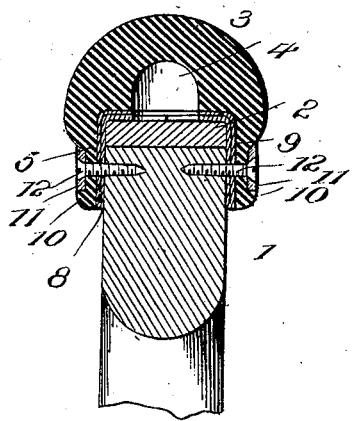

In the modification shown in Fig. 6 the edge of the securing-flanges is provided with a bead 10, and the tire is secured onto the wheel-felly or rim by means of a circular clamping-ring 11, which is perforated to receive the screws 12. This ring may be made in sections, if desired; but the continuous ring is preferred. The tire shown in the other forms of my invention is preferably secured into the wheel-rim by means of small nails or tacks passing through the securing-flanges, or it may be secured by means of the ring 11.

It will be noted that the reinforcing material is made to line the sides and bottom of the groove or channel formed by the flanges and inner periphery of the tire in one continuous width, so that additional strength will be imparted to the tire at the angles $a$ $a$ to prevent the tire from cracking at these points.

It has been found in practice to be highly important that the rubber tire should be of a greater width than the metal tire or the felly, and in devising my invention I have had this object in view. In order to provide a firm seat for the metal-tired wheel and strengthen the side flanges at their points of juncture with the rubber tire, it is necessary to increase the thickness of the rubber at these points. This is done by providing a "filling" or "backing" of sufficient thickness to prevent the flanges from splitting or cracking at said points and further strengthen them by lining the inner side walls of the flanges and the inner periphery of the tire with a strip of suitable reinforcing material, so that the angles $a$ $a$ will be fully protected from injury by any lateral strain or shock to which the tire may be subjected.

Of course it will be understood that more than one row of longitudinal holes or cavities 4 may be employed to obtain a cushioning effect, and I therefore do not wish to be limited to a single row. The holes or cavities being of uniform diameter throughout their entire depth, there are no angles or corners to become injured by the pressure of the load, and the walls or partitions between the cavities will cause the tire to resume its normal shape at the instant pressure is removed.

Having thus fully described my invention, what I claim, and desire to secure by Letters Patent, is—

1. As a new article of manufacture, a rubber tire having integral inwardly-extending securing-flanges, forming, with the inner periphery of the tire, a right-angled groove or channel to receive the rim of a wheel, and a reinforcing-lining of canvas or similar material, secured in said groove or channel in such a manner that the angles of the groove or channel will be protected from injury by said canvas lining, said tire being thickened at points opposite the angles of the groove or channel.

2. As a new article of manufacture, a rubber tire having inwardly-extending securing-flanges, set back from the outer side surface of the tire, said flanges forming, with the inner periphery of said tire, a groove or channel to receive the rim of a wheel, said tire being thickened at points opposite the angles of the groove or channel, and a lining of canvas or similar material secured in said groove or channel to reinforce the angles thereof, said tire being provided with cushioning-cavities in its inner periphery.

3. The combination with the rim of a wheel, of a rubber tire provided with side flanges to form a groove or channel adapted to receive the wheel-rim, a canvas or other similar lining secured in the groove or channel to reinforce the angles thereof, said tire being thickened at points opposite the angles and provided with inner peripheral cushioning-cavities, and means for securing the tire onto the wheel.

In testimony whereof I affix my signature in the presence of two witnesses.

WEBBER G. KENDALL.

Witnesses:
J. R. NOTTINGHAM,
EDWIN S. CLARKSON.